Oct. 15, 1946.   A. W. SADDINGTON   2,409,392
MANUFACTURE OF SODIUM SULPHIDES
Filed Oct. 9, 1943
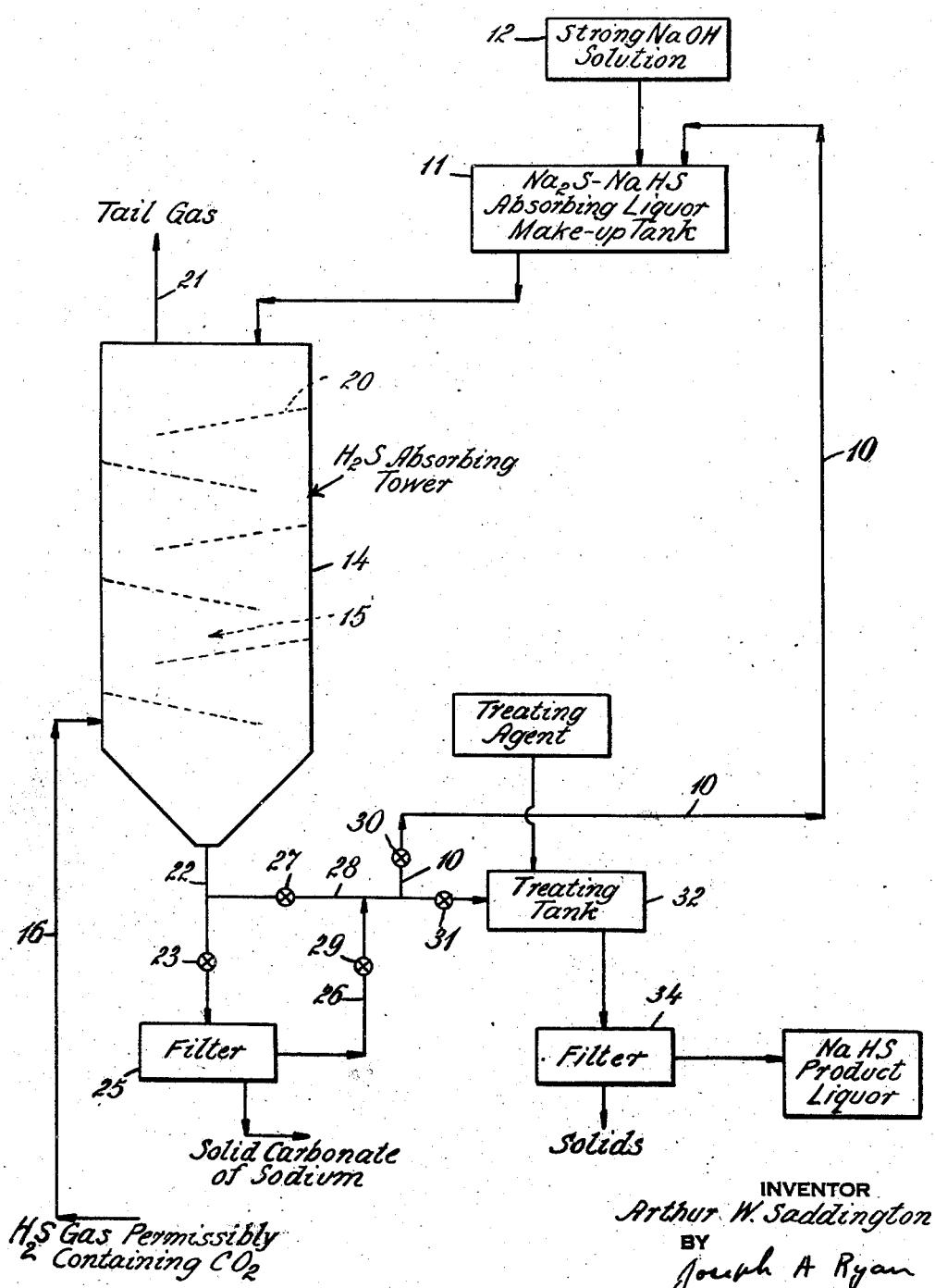
INVENTOR
Arthur W. Saddington
BY
Joseph A. Ryan
ATTORNEY Patented Oct. 15, 1946

2,409,392

UNITED STATES PATENT OFFICE 2,409,392

MANUFACTURE OF SODIUM SULFIDES

Arthur W. Saddington, Syracuse, N. Y., assignor to The Solvay Process Company, New York, N. Y., a corporation of New York Application October 9, 1943, Serial No. 505,596

10 Claims. (Cl. 23—134)

This invention relates to the manufacture of sodium hydrosulfide (NaHS) or sodium sulfide ($Na_2S$) or mixtures of both.

It is known that sodium hydroxide may be reacted with $H_2S$ to form $Na_2S$ which may be treated with more $H_2S$ to convert $Na_2S$ to NaHS, and it has been proposed to make sodium hydrosulfide by gassing an $Na_2S$-NaHS liquor with pure hydrogen sulfide.

In processes of the type to which the invention relates, the source of sodium is commercial caustic soda which contains appreciable quantities of impurities, such as iron, copper, nickel, manganese and silicon. These impurities do not discolor caustic soda to any great extent, and hence their presence in commercial caustic is unobjectionable. However, during $H_2S$ gassing of commercial caustic liquor, such impurities pass thru the process and are carried into the resulting NaHS liquor. Such impurities may be present in the NaHS liquor as soluble salts or suspended in finely divided condition. While probably largely sulfides, exact compositions of the impurities are not known, and whatever their nature, these substances are referred to herein as metallic impurities. The presence of even small amounts of these impurities in $Na_2S$ or NaHS solutions results in products of very poor appearance because of the highly colored nature of the impurities after having been subjected to $H_2S$ gassing. Accordingly, a major problem presented in manufacture of relatively pure sodium hydrosulfide has been the elimination of such impurities.

Commercially available hydrogen sulfide gases contain appreciable amounts of carbon dioxide as an impurity. The discoveries constituting this invention arose out of attempts to manufacture, in accordance with known procedure, relatively pure sodium hydrosulfide from commercial caustic soda and hydrogen sulfide gases containing carbon dioxide. The prior art indicates that when an $Na_2S$-NaHS liquor is gassed with pure $H_2S$ sufficient to convert all of the $Na_2S$ content of the liquor to NaHS and gassing is continued utilizing a substantial excess of $H_2S$, the metallic impurities in the liquor coagulate and precipitate in a filterable form. I noted that, in no instance, are coagulation and precipitation of metallic impurities effected where the sodium hydrosulfide liquor has been produced from $H_2S$ gas containing $CO_2$, even if all the $Na_2S$ has been converted to NaHS and a further large excess of $H_2S$ has been employed. This observation led to a further finding that when using commercial caustic soda as the source of sodium, coagulation and precipitation of metallic impurities are not obtained consistently even when pure $H_2S$ gas is used and even though the liquor has been gassed with a large excess of $H_2S$. Thus, while the prior art indications are that coagulation and precipitation of metallic impurities may be had by gassing the liquor to such an extent that the liquor contains no $Na_2S$ and then using an excess of $H_2S$, I find these conditions are not controlling in all circumstances, and have discovered that coagulation and precipitation of impurities are dependent upon the composition of the NaHS liquor with respect to carbonate of sodium and $Na_2S$ contents. While not identified with certainty, indications are that the carbonate of sodium present in the system is in the form of $Na_2CO_3$ and for convenience will be referred to as such in this specification.

It will be understood that good grades of commercial caustic soda contain appreciable amounts, sometimes as much as 0.16–0.20%, of $Na_2CO_3$. Further, synthetic $H_2S$ gas also contains appreciable quantity of $CO_2$ as an impurity, while the more common hydrogen sulfide gases, such as those formed in oil refining operations, often contain as much as 10–25% $CO_2$ by volume.

A principal object of this invention lies in provision of a process for making sodium hydrosulfide or sodium sulfide, of purity acceptable to the trade, from commercial raw materials which constitute a source of metallic impurities and sodium carbonate in the NaHS liquor resulting from $H_2S$ gassing. The invention also aims to provide a process which permits use of an $H_2S$ gas containing substantial amount of $CO_2$. Further objects are provision of a process by which it is possible to avoid troublesome solid sodium sulfide phase during the NaHS producing reaction, to operate such reaction continuously and at relatively low temperature, and if desired to provide for quantitative utilization of hydrogen sulfide.

The process of the invention comprises generally three major stages: first, formation of a suitable $Na_2S$-NaHS starting liquor utilizing commercial NaOH as a raw material; second, a reaction stage in which the $Na_2S$-NaHS liquor is contacted with hydrogen sulfide gas to convert $Na_2S$ to NaHS; and third, a purification stage in which the NaHS liquor discharged from the reaction stage is treated in accordance with certain principles of the invention to effect (a) reduction of the amount of available sodium carbonate present in the liquor, and (b) control of the composition of such liquor with respect to $Na_2S$ content, whereby to bring about elimination from the system of metallic impurities brought into the process as impurities in the initial caustic soda.

The nature of the invention is such that a major advantage is that H2S gas containing a substantial amount of CO2 may be employed. Hence, a preferred embodiment, using H2S containing CO2, is described below in connection with the accompanying drawing diagrammatically showing suitable apparatus.

In usual practice of the invention, the Na2S-NaHS absorbing liquor in tank 11 is made by treating a portion of NaHS product liquor of a previous run with commercial sodium hydroxide which may contain say 0.1-0.2% or more by weight of Na2CO3. However, to start the process an aqueous solution of sodium hydroxide of any suitable concentration, e. g. 50-70% NaOH, may be gassed with hydrogen sulfide, preferably pure, to such an extent as to form a liquor containing Na2S and a substantial amount of NaHS. In this preliminary step, the liquor mass should be kept at any suitable temperature, e. g. 70° C. or upwards depending upon the sodium sulfide concentration of the liquor, needed to maintain all of the sodium sulfides in the liquid phase. Preliminary starting liquor, as to composition and temperature, should be similar in all respects to the absorbing liquor formed during the usual practice of the process which is preferably continuous.

When the process is under way, a portion of the sodium hydrosulfide liquor discharged from the H2S gassing zone is run continuously thru line 10 into Na2S-NaHS absorbing liquor make-up tank 11 which may be steam jacketed to keep temperature high enough to hold all sodium sulfide in liquid phase. While H2S gassing zone effluent liquor may contain a limited amount of Na2S, such liquor is preferably an aqueous solution of sodium hydrosulfide containing substantially no Na2S. A strong solution of NaOH from tank 12 is likewise continuously fed into make-up tank 11. Although an absorbing liquor containing any suitable relative proportions of Na2S and NaHS may be employed, it is more desirable to regulate feed of NaHS liquor and sodium hydroxide solution to tank 11 in such a way as to maintain therein an absorbing liquor of certain composition with respect to Na2S and NaHS, purpose of this feature being to provide an absorbing liquor of such composition as to make possible ready maintenance of sodium sulfide in the liquid phase both in tank 11 and in the subsequent reaction stage in which Na2S of the absorbing liquor is converted to NaHS, and further to facilitate carrying out the H2S contacting operation at relatively low temperatures. To afford accomplishment of these ends, feed of sodium hydrosulfide liquor from line 10 and of NaOH solution from tank 12 to the make-up tank is regulated to provide therein an absorbing liquor desirably containing not more than 15% by weight of Na2S. Especially where it is desired to supply absorbing liquor to the H2S reaction zone at a relatively low temperature, e. g. 70-80° C., and at the same time avoid any solid phase formation either in the absorbing liquor make-up tank or in the reaction zone, it is preferred to control formation of the absorbing liquor in such a way that the liquor contains not more than 10% by weight of Na2S and at least 25% by weight of NaHS.

While the entire process may be practiced batchwise, one of the advantages afforded is continuous operation, and accordingly absorbing liquor is fed continuously from make-up tank 11 into the top of a tower 14 providing a reaction zone 15 in which the absorbing liquor is contacted preferably counter-current with H2S gas from an inlet pipe 16, which gas, in accordance with the invention, may permissibly contain substantial amounts of carbon dioxide.

I have found that any carbon dioxide contained in the hydrogen sulfide gas reacts substantially quantitatively with Na2S to form a reaction product which appears and is herein considered for purposes of illustration to be sodium carbonate. I further observe that most of this sodium carbonate immediately precipitates as a solid readily filterable form. Since the H2S gas used may contain substantial amount of carbon dioxide the quantity of solid sodium carbonate produced may be correspondingly substantial. When the process is carried out as a batch procedure, solid sodium carbonate readily settles to the bottom of the reaction vessel and causes no particular operating difficulty. However, to provide for continuous operation throughout, I find that because of formation of solid sodium carbonate it is not feasible to carry out the NaHS producing reaction in the more or less usual type of packed liquor-gas contacting tower. An open spray tower, containing no packing and provided at the top with a spray head for introduction of Na2S-NaHS absorbing liquor and at the bottom an inlet for the H2S gas, may be employed. Contact towers containing baffles 20 such as indicated on the drawing may be used, although in such instance baffle arrangement should be such as to afford good contact of gas and liquor but at the same time permit downflow of a relatively light slurry and discharge of all of the slurry from the bottom of the tower. The type of liquor-gas contacting tower suitable for use in practice of the continuous basis may be defined as an unobstructed reaction chamber, but it should be understood that the term unobstructed is used in the sense that while the reaction chamber may contain mixing baffles, construction of these baffles is such as not to cause plugging but permits retarded but steady downflow of liquor containing some solids in suspension.

Hence in the preferred continuous operation, absorbing liquor of the type described is run into the top of a contact tower of suitable design, a stream of H2S gas which may contain carbon dioxide is fed into the bottom, unused and inert gases leave the top of the tower thru pipe 21, and reacted liquor is discharged from the bottom into pipe 22 provided with valve 23. Hydrogen sulfide and carbon dioxide react with Na2S of the absorbing liquor to form NaHS and sodium carbonate, and any Na2CO3 impurity contained in the initial commercial NaOH passes thru the contacting zone unchanged. As a whole, reactions effected in the contacting zone are exothermic and some heat is developed. Broadly, the absorbing operation may be carried out at any temperature high enough to keep all sodium sulfides in the liquor phase under the prevailing conditions of operation. However, temperatures in the reaction zone above about 90° C. are not desirable because of greatly accelerated corrosion of equipment. I find that by regulating the composition of the Na2S-NaHS absorbing liquor as in the above indicated preferred conditions, it is possible to feed the absorbing liquor to the reaction zone at a low temperature, e. g. 70-80° C., in which case the heat developed in the reaction zone automatically maintains a temperature high enough to keep all sodium sulfides in the liquid phase but does not exceed the indicated maximum temperature and does not require extraneous cooling.

While the carbon dioxide content of the H₂S gas fed to the reaction zone may vary considerably and may be usually about 10% by volume, ordinarily it is preferred that such gas contain a predominating amount of H₂S and not more than about 25% CO₂ by volume.

In practice of the embodiment being described, design of the gas-liquor contacting tower and rates of feed thereto of absorbing liquor and H₂S gas, whether the process is carried out batchwise, countercurrent, or co-current, are regulated so that during the contacting operation reaction of the Na₂S content of the absorbing liquor fed to the contacting zone is effected to such an extent that the reaction zone effluent NaHS liquor contains not more than 5% by weight of Na₂S, and preferably substantially no Na₂S at all. Reason for such conversions of the Na₂S content of NaHS will subsequently appear.

In usual operation, employing an H₂S gas containing substantial amount of CO₂, the NaHS liquor discharged from the bottom of tower 14 contains a substantial amount of suspended solid sodium carbonate which is readily separable and is removed by filter 25. The filtrate in pipe 26 contains in solution the metallic impurities such as iron, brought into the process as impurities in the commercial sodium hydroxide or picked up from the liquor make-up or gassing apparatus, and if any NaHS or Na₂S product were recovered directly from the filtrate, such products would be badly discolored and contain these impurities in amounts in excess of trade specifications.

As above stated, prior literature indicates that when an Na₂S-NaHS liquor is gassed with enough H₂S to convert all Na₂S to NaHS, plus a substantial excess of H₂S, the metallic impurities in the liquor coagulate and precipitate out in a filterable form. I have found, with respect to consistently securing coagulation and precipitation of metallic impurities, that the controlling factors are the amounts of carbonate of sodium and Na₂S present in the NaHS liquor, and that the use of an excess of H₂S is not critical. For example, in one operation, in which a substantial excess of H₂S was employed, and the resulting liquor contained 46% by weight of NaHS, no Na₂S, and carbonate of sodium in amount equivalent to 0.08% by weight of CO₃ radical, the liquor remained dark brown and there was no coagulation and precipitation of metallic impurities.

I have found that if sodium hydrosulfide liquor is saturated with carbonate of sodium, or contains an amount of available (i. e. in solution or both in solution and in solid form) carbonate of sodium equivalent to more than 0.06% by weight of CO₃ radical, metallic impurities do not coagulate or precipitate even though the liquor contains no Na₂S and has been treated with a large excess of H₂S, and regardless of whether the liquor has been made by gassing with pure H₂S or with H₂S containing carbon dioxide. I find that if available carbonate of sodium is substantially completely removed from an NaHS liquor, or removed to an extent such that the liquor does not contain an amount of available carbonate of sodium equivalent to more than 0.06% by weight of CO₃ radical, metallic impurities coagulate and precipitate even if the liquor contains a substantial amount of Na₂S. The preferred condition of operation is to bring about substantially complete removal of available carbonate of sodium. The second factor critical as to effecting coagulation and precipitation of metallic impurities is the Na₂S content of the NaHS liquor. I have found that, in conjunction with the maximum carbonate of sodium tolerance noted above, the NaHS liquor should contain not more than 5% by weight of Na₂S, and preferably substantially no Na₂S at all. The preferred conditions of substantial absence of available carbonate of sodium and of substantial absence of Na₂S, cause the most thorough and rapid coagulation and precipitation of metallic impurities. Other permissible conditions, as to available carbonate of sodium and Na₂S contents, within the limits stated bring about an ultimately satisfactory coagulation and precipitation of metallic impurities, the overall difference being that as the available carbonate of sodium and Na₂S contents increase to the maximum values noted, rates of coagulation and precipitation of metallic impurities correspondingly decrease. Hence, briefly, the invention involves formation of sodium hydrosulfide liquor containing certain metallic impurities and also an amount of carbonate of sodium equivalent to more than 0.06% by weight of CO₃ radical, and comprises the steps of reducing the available carbonate of sodium content of the liquor to an amount equivalent to not more than 0.06% by weight of CO₃ radical, and controlling the composition of the resulting liquor so that such liquor contains not more than 5% by weight of sodium sulfide.

In the more usual practice of the invention process, i. e. where the H₂S gas contains substantial amount of CO₂ and the reaction zone liquor effluent contains a comparable substantial amount of solid sodium carbonate, the clear liquor filtrate in line 26 contains soluble sodium carbonate to the point of saturation and may well contain in solution say 0.2–0.5% or more by weight sodium carbonate. In the modification being described, valve 27 in pipe 28 is closed and valve 29 is open. A portion of the filtrate runs into recycle line 10, and by suitable adjustment of valves 30 and 31, a portion of the filtrate corresponding with the "make" of one cycle of the process is run thru valve 31 into a tank 32 in which the NaHS liquor is treated in any suitable way to bring the sodium carbonate content down to the conditions stated. Carbonate reduction or elimination may be effected by treating the filtrate with a compound of an alkaline earth metal, e. g. calcium compound capable of reacting with the soluble sodium carbonate to precipitate the combined CO₃ as calcium carbonate. The amount of treating material used should be at least sufficient to reduce soluble sodium carbonate content of the NaHS liquor to an amount equivalent to not more than 0.06% by weight of CO₃ radical. Preferably, the quantity of treating agent employed is that which is theoretically required to react with all of the soluble sodium carbonate. The preferred treating material is calcium hydrosulfide, and in this instance sodium carbonate is converted in accordance with the equation $$Ca(HS)_2 + Na_2CO_3 \rightarrow CaCO_3 + 2NaHS$$

calcium carbonate being precipitated and the sodium of the Na₂CO₃ being converted to NaHS, the desired product. The calcium hydrosulfide treatment does not bring about any increase in the Na₂S content of the treated liquor. In this instance, the control of the treated liquor composition, with respect to $Na_2S$ content, is had by regulating the $H_2S$ gassing in tower 14 so that the NaHS liquor fed to the treating tank contains not more than 5% by weight of $Na_2S$ or any lesser amount that may be desired in that particular operation. The foregoing procedure creates conditions which cause coagulation and precipitation of the metallic impurities in readily filterable form. The treated liquor is then filtered in filter 34 to remove the calcium carbonate and the metallic impurity precipitates.

In place of calcium hydrosulfide, other treating material such as $Ca(OH)_2$ may be employed. In this instance $Ca(OH)_2$ reacts with $Na_2CO_3$ to form $CaCO_3$ and NaOH which in turn reacts with NaHS to form $Na_2S$, thus increasing the $Na_2S$ content of the NaHS liquor undergoing treatment. Should the quantity of $Ca(OH)_2$ used be sufficient to raise the $Na_2S$ content of the treated liquor to above the maximum permissible $Na_2S$ value for that particular operation, after the $Ca(OH)_2$ treatment, the liquor in tank 32 may be gassed with enough $H_2S$, preferably pure, to lower the $Na_2S$ content to the desired amount. In this mode of operation, control of the $Na_2S$ content of $Ca(OH)_2$ treated liquid is had partly by gassing in tower 14 and partly by gassing in tank 32.

It will be noted that even when $Ca(HS)_2$ is used as a treating agent, it is not critically important that the NaHS liquor fed into tank 32 contain not more than the permissible $Na_2S$ maximum for that operation. For example, an $Na_2S$ liquor containing say 6% by weight of $Na_2S$ may be fed into tank 32, treated with $Ca(HS)_2$, and thereafter gassed with enough $H_2S$, preferably pure, to reduce the $Na_2S$ content to the point desired. Hence, it will be understood that control of the composition, with respect to $Na_2S$ content, of the treated liquor may be effected either before or after, or partly before and partly after treatment with the sodium carbonate content reducing agent, and unless specifically stated to be contrary, the appended claims are to be so construed.

In some modifications the reaction zone effluent may contain only a relatively small amount of solid sodium carbonate, e. g. where the $H_2S$ gas contains no or only a small amount of $CO_2$. In these instances, valve 27 may be opened, valves 23 and 29 closed, filter 25 by-passed, and filtration of the reaction effluent may be omitted. However, in such circumstances the amount of treating agent used in tank 32 should be sufficient to react with all available sodium carbonate (i. e. both solid and soluble) present at the time of addition of the calcium compound to an extent such that the treated liquor does not contain more available carbonate of sodium than is equivalent to 0.06% by weight of $CO_3$ radical. Otherwise, procedure is the same.

In practice of the invention, when treating NaHS liquors, containing as high as 4.2% by weight of $Na_2S$, in such a way as to reduce the available carbonate of sodium content substantially to zero, straw yellow product liquors have been obtained containing as little as 0.0002% $Fe_2O_3$ and 0.045% $SiO_2$ by weight.

While the invention has been described chiefly in connection with use of an $H_2S$ gas containing $CO_2$, it is noted that the invention is not thus restricted. It will be understood that many grades of commercial caustic contain sufficient $Na_2CO_3$ as an impurity to result in formation of an NaHS liquor containing more than the indicated tolerable maximum of carbonate of sodium. The principles of the invention apply to purification of NaHS liquors containing an amount of available carbonate of sodium equivalent to more than 0.06% by weight of $CO_3$ radical, no matter how such liquors are produced.

It will be understood that if the final product desired is NaHS, gassing in the reaction zone, and in tank 32 if needed, is carried out to an extent sufficient to convert all the $Na_2S$ to NaHS. On the other hand if an $Na_2S$ product is desired, except as indicated, complete conversion of $Na_2S$ to NaHS is unnecessary, since the liquor effluent of filter 34 may be treated with NaOH to cut back the product to $Na_2S$. If desired, the NaHS or $Na_2S$ may be converted to solid form by evaporation of the liquors and solidification by known methods.

I claim:

1. The method for producing purified sodium hydrosulfide from a sodium hydrosulfide liquor containing (a) at least one metallic impurity of the group consisting of iron, copper, nickel, manganese and silicon, and (b) an amount of available carbonate of sodium equivalent to more than 0.06% by weight of $CO_3$ radical, which method comprises treating said liquor with an alkaline earth compound so as to react with available carbonate of sodium to precipitate combined $CO_3$ thereof as alkaline earth carbonate, the amount of said alkaline earth compound being at least sufficient to reduce the available carbonate of sodium content of said liquor to an amount equivalent to not more than 0.06% by weight of $CO_3$ radical, controlling the composition of the resulting liquor so that such liquor contains not more than 5% by weight of sodium sulfide, thereby effecting coagulation and precipitation of metallic impurities, and separating said metallic impurities from such liquor.

2. The method for producing purified sodium hydrosulfide from a sodium hydrosulfide liquor containing (a) metallic impurities of the type present in commercial sodium hydroxide, and (b) an amount of available carbonate of sodium equivalent to more than 0.06% by weight of $CO_3$ radical, which method comprises treating said liquor with an alkaline earth compound so as to react with available carbonate of sodium to precipitate combined $CO_3$ thereof as alkaline earth carbonate, the amount of said alkaline earth compound being at least sufficient to reduce the available carbonate of sodium content of said liquor to an amount equivalent to not more than 0.06% by weight of $CO_3$ radical, controlling the composition of the resulting liquor so that such liquor contains not more than 5% by weight of sodium sulfide, thereby effecting coagulation and precipitation of metallic impurities, and separating said metallic impurities from such liquor.

3. The method of producing purified sodium hydrosulfide which comprises forming an $Na_2S$-NaHS liquor containing metallic impurities of the type present in commercial sodium hydroxide, contacting said liquor with an $H_2S$ gas under temperature conditions high enough to maintain sodium sulfide in liquid phase, continuing contact of the liquor and $H_2S$ gas for an interval sufficient to effect conversion of at least a major portion of the $Na_2S$ content of said liquor to NaHS thereby forming an NaHS liquor containing, as a result of presence of oxide of carbon impurities in the system, an amount of available carbonate of sodium equivalent to more than 0.06% by weight of $CO_3$ radical, reducing the available carbonate of sodium content of said NaHS liquor to an amount equivalent to not more than 0.06% by weight of $CO_3$ radical, controlling the composition of the resulting NaHS liquor so that such liquor contains not more than 5% by weight of sodium sulfide, thereby effecting coagulation and precipitation of metallic impurities, and separating said metallic impurities from such liquor.

4. The method of producing purified sodium hydrosulfide which comprises forming an $Na_2S$-NaHS liquor containing metallic impurities of the type present in commercial sodium hydroxide, contacting said liquor with an $H_2S$ gas containing $CO_2$ as an impurity under temperature conditions high enough to maintain sodium sulfide in liquid phase, continuing contact of the liquor and $H_2S$ gas for an interval sufficient to effect conversion of at least a major portion of the $Na_2S$ content of said liquor to NaHS thereby forming an NaHS liquor containing an amount of available carbonate of sodium equivalent to substantially more than 0.06% by weight of $CO_3$ radical, reducing the available carbonate of sodium content of said NaHS liquor to an amount equivalent to not more than 0.06% by weight of $CO_3$ radical, controlling the composition of the resulting NaHS liquor so that such liquor contains not more than 5% by weight of sodium sulfide, thereby effecting coagulation and precipitation of metallic impurities, and separating said metallic impurities from such liquor.

5. The method of producing purified sodium hydrosulfide which comprises forming an $Na_2S$-NaHS liquor containing metallic impurities of the type present in commercial sodium hydroxide, contacting said liquor with a gas containing predominantly $H_2S$ and a substantial amount of $CO_2$ as an impurity under temperature conditions high enough to maintain sodium sulfide in liquid phase, continuing contact of liquor and $H_2S$ gas for an interval sufficient to effect conversion of $Na_2S$ to NaHS to such an extent that the resulting NaHS liquor contains not more than 5% by weight of $Na_2S$, said NaHS liquor containing carbonate of sodium in solution and as a solid precipitate, separating solids from said NaHS liquor thereby recovering NaHS liquor containing in solution an amount of carbonate of sodium equivalent to more than 0.06% by weight of $CO_3$ radical, treating said recovered NaHS liquor with calcium hydrosulfide in amount substantially equivalent to that needed to precipitate soluble combined $CO_3$ as calcium carbonate, thereby effecting coagulation and precipitation of metallic impurities, and separating said metallic impurities from said recovered NaHS liquor.

6. The method of producing purified sodium hydrosulfide which comprises forming an $Na_2S$-NaHS liquor containing metallic impurities of the type present in commercial sodium hydroxide, continuously introducing said liquor into a relatively unobstructed reaction zone and contacting said liquor therein with a gas containing predominantly $H_2S$ and a substantial amount of $CO_2$ as an impurity under temperature conditions high enough to maintain sodium sulfide in liquid phase, regulating contacting of liquor and $H_2S$ gas in said zone for an interval sufficient to effect conversion of $Na_2S$ and NaHS to such an extent that the NaHS liquor formed contains not more than 5% by weight of $Na_2S$, said NaHS liquor containing carbonate of sodium in solution and as a solid precipitate, continuously withdrawing such NaHS liquor and suspended solids from the reaction zone, separating solids from said NaHS liquor thereby recovering NaHS liquor containing in solution an amount of carbonate of sodium equivalent to more than 0.06% by weight of $CO_3$ radical, treating recovered NaHS liquor with a calcium compound so as to react with soluble carbonate of sodium to precipitate combined $CO_3$ thereof as calcium carbonate, the amount of said calcium compound being at least sufficient to reduce the soluble carbonate of sodium content of said recovered NaHS liquor to an amount equivalent to not more than 0.06% by weight of $CO_3$ radical, controlling the composition of the resulting NaHS liquor so that such liquor contains substantially no sodium sulfide, thereby effecting coagulation and precipitation of metallic impurities, and separating said metallic impurities from the NaHS liquor.

7. The method of producing purified sodium hydrosulfide which comprises forming an $Na_2S$-NaHS liquor containing metallic impurities of the type present in commercial sodium hydroxide, continuously introducing said liquor into a relatively unobstructed reaction zone and countercurrently contacting said liquor therein with a gas containing predominantly $H_2S$ and a substantial amount but not more than 25% by volume of $CO_2$ as an impurity under temperature conditions high enough to maintain sodium sulfide in liquid phase, regulating contacting of liquor and $H_2S$ gas in said zone for an interval sufficient to effect conversion of $Na_2S$ and NaHS to such an extent that the resulting NaHS liquor contains substantially no $Na_2S$, said NaHS liquor containing carbonate of sodium in solution and as a solid precipitate, continuously withdrawing such NaHS liquor and suspended solid from the reaction zone, separating solids from said NaHS liquor thereby recovering NaHS liquor containing in solution an amount of carbonate of sodium equivalent to more than 0.06% by weight of $CO_3$ radical, treating recovered NaHS liquor with calcium hydrosulfide in amount substantially equivalent to that needed to precipitate soluble combined $CO_3$ as calcium carbonate, thereby effecting coagulation and precipitation of metallic impurities, and separating said metallic impurities from said recovered NaHS liquor.

8. The method of producing purified sodium hydrosulfide from a sodium hydrosulfide liquor containing (a) at least one metallic impurity of the group consisting of iron, copper, nickel, manganese and silicon, and (b) an amount of available carbonate of sodium equivalent to more than 0.06% by weight of $CO_3$ radical, which method comprises reducing the available carbonate of sodium content of said liquor to an amount equivalent to not more than 0.06% by weight of $CO_3$ radical, controlling the composition of the resulting liquor so that such liquor contains not more than 5% by weight of sodium sulfide, thereby effecting coagulation and precipitation of metallic impurities, and separating said metallic impurities from such liquor.

9. The method of producing purified sodium hydrosulfide from a sodium hydrosulfide liquor containing (a) at least one metallic impurity of the group consisting of iron, copper, nickel, manganese and silicon, and (b) an amount of available carbonate of sodium equivalent to more than 0.06% by weight of $CO_3$ radical, which method comprises treating said liquor with calcium hydrosulfide in amount substantially equivalent to that needed to react with available carbonate of sodium to precipitate combined $CO_3$ thereof as calcium carbonate, controlling the composition of the resulting liquor so that such liquor contains not more than 5% by weight of sodium sulfide, thereby effecting coagulation and precipitation of metallic impurities, and separating said metallic impurities from such liquor.

10. The method of producing purified sodium hydrosulfide from a sodium hydrosulfide liquor containing (a) metallic impurities of the type present in commercial sodium hydroxide, and (b) an amount of available carbonate of sodium equivalent to more than 0.06% by weight of $CO_3$ radical, which method comprises reducing the available carbonate of sodium content of said sodium hydrosulfide liquor to an amount equivalent to not more than 0.06% by weight of $CO_3$ radical, controlling the composition of the resulting liquor so that such liquor contains not more than 5% by weight of sodium sulfide, thereby effecting coagulation and precipitation of metallic impurities, and separating said metallic impurities from such liquor.

ARTHUR W. SADDINGTON.